July 7, 1970  MOTOMI KONO  3,518,777

HEAT EXCHANGE APPARATUS FOR FLUIDIZING PARTICULATE MATERIAL

Filed Jan. 29, 1968

United States Patent Office 3,518,777
Patented July 7, 1970

3,518,777
HEAT EXCHANGE APPARATUS FOR FLUIDIZING PARTICULATE MATERIAL
Motomi Kono, 627 2-chome, Nishiichinoe,
Edogawa-ku, Tokyo, Japan
Filed Jan. 29, 1968, Ser. No. 701,315
Int. Cl. F26b 17/10
U.S. Cl. 34—57                                      1 Claim

ABSTRACT OF THE DISCLOSURE

A double walled vessel closed at the top and bottom has a space between the walls for circulating a heat exchange method. The pulverous or particulate material which is to be heated, cooled, or dried, is introduced into the inner chamber and caused to circulate therein by means of a gaseous fluid causing such material to be spiraled against the inner wall to be subject to the heat exchange method. A filter is provided in the top to permit escape of the gaseous fluid without allowing escape of the particulate material.

---

This invention pertains to a heat exchange apparatus and method having particular relation to heating, drying or cooling substances in particulate or pulverous form, hereafter called particulate material, and features a method in which the particulate material is repeatedly whirled upwardly along a heat conducting surface whereby the heat exchange between the particulate material and the conducting surface is obtained with high efficiency. There are various known forms of apparatus for heating, drying and cooling substances in particulate form. In one form of this type of apparatus, an upwardly inclined nozzle is placed at the base of the heat conducting vessel and a gaseous fluid, which may be air, is supplied to stir and produce an upward and downward flow of the substance. In apparatus of this type, it is difficult to remove or diminish the layer adjacent to the conducting surface which becomes a barrier to effective heat exchange, also phenomena such as blow-through (a straight path is formed in the air powder mix) or bubbling (successive bubbles are formed in the mix at the nozzle) are encountered both of which are detrimental to effective stirring of the powder and which produce nonhomogeneous batches in the mix which in turn results in poor heat exchange and thus results in longer heating, drying, or cooling time and low productivity.

The main object of this invention is to whirl the particulate material along a cylindrical heat conducting surface in an upward direction, and then cause a downward flow in the center of the cylindrical heat conducting vessel to complete a circulatory motion of the air and particulate material.

The object of this invention is to utilize the centrifugal force, which is the result of the whirling motion, and causes the particulate material to hit or rub against the cylindrical wall of the heat conducting vessel.

The aforementioned centrifugal force tends to diminish or eliminate the heat exchange barrier layer adjacent to the heat exchange surface. It also prevents balling (the forming of lumps by layers of the powder building up on a nucleus) and the sticking of the particulate material on the heat exchange surface, and thereby provides homogeneous contact of the powder or particulate material with the heat conducting surface resulting in highly efficient heat exchange and drying.

Another object of this invention is to arrange a plurality of nozzles annularly around the neck of a funnel shaped bottom attached to a cylindrical heat exchange vessel, said vessel having an outer wall to provide a chamber for the heat exchange medium, and said nozzles being upwardly inclined along the surface of the funnel and thus providing means to produce a plurality of jets of compressed gaseous fluid at an upward angle to and along the surface of the funnel.

Another object of this invention is to arrange a plurality of nozzles in a circle around the outside periphery of an inverted cone placed at the bottom of a cylindrical heat conducting surface, said cone serving as a removable cap for the vessel. Said nozzles being upwardly inclined along the surface of the cylinder provide means to produce a plurality of jets of compressed gaseous fluid at an upward angle to and along the surface of the cylindrical heat exchange surface.

An additional object of this invention is to provide heating mediums such as heated steam, heated air, heated oil, or electrically heated wire, or cooling mediums such as cold air or cold water, by flowing or inserting in the heat exchange medium chamber, and the compressed gaseous fluid issuing from the nozzles can be heated, dried, or cooled, at normal or room temperature, and the volume can be such that it is sufficient to whirl the substance along the surface of the heat exchange vessel in an upwardly spiraling path, or can be increased to be more than sufficient for this action.

Another object of this invention is the placement of a filter bag on the underside of the top plate of a cylindrical heat exchange vessel, said bag allowing the escape of the gaseous fluid blown into the vessel while preventing the escape of the particulate material.

Two examples of typical applications of this invention are illustrated in the drawings, wherein.

Figure 1:
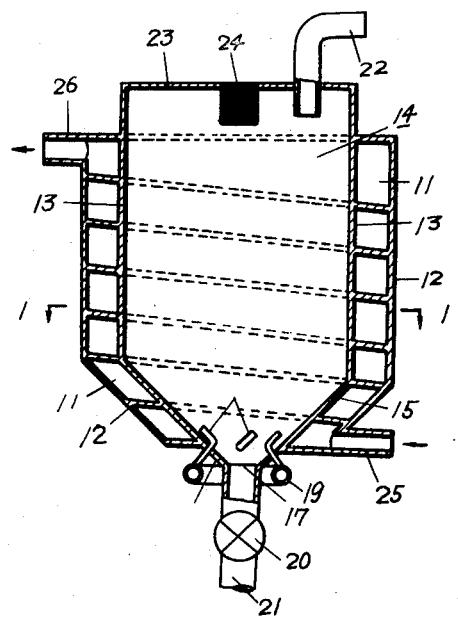
FIG. 1 is a vertical sectional view of the apparatus.
Figure 2:
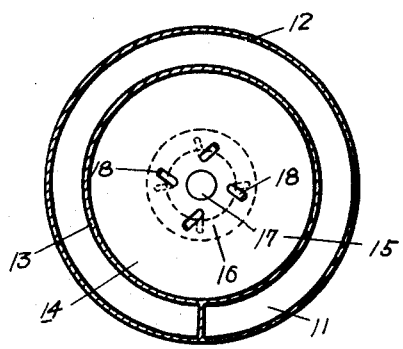
FIG. 2 is a horizontal sectional view across 2—2 in FIG. 1.

To further explain this invention according to the basic apparatus illustrated in FIGS. 1 and 2, a cylindrical chamber 14 which has funnel shaped bottom 15, the cylindrical wall 13 of which comprises a heat exchange surface which is surrounded by heat exchange medium chamber 12 with upwardly spiraled path 11. The funnel shaped bottom 15 has an opening 17 with nozzles 18 arranged around said opening and placed around the periphery of bottom plate 16 and connected to ring shaped manifold 19 through which compressed gaseous fluid is supplied to the nozzles 18. Said nozzles are upwardly inclined along the surface of the funnel 15. At the neck of the funnel 15, there is a pipe 21 with a valve 20 for removing the contents of the vessel. An inlet or charging pipe 22 is connected to the top plate 23 of vessel 14 for loading the vessel. The top plate 25 has a filter bag 24 attached to its under side adjacent its center, said bag permitting escape of gaseous fluid, but does not permit passage of the particulate material.

To heat or to dry the substance to be treated, the compressed gaseous fluid which is supplied to the vessel through nozzles 18 is ordinarily gaseous fluid at normal or room temperature and humidity. However, if it is necessary to shorten the time, heated or heated and dried gaseous fluid can be used. The heat exchange wall 13 is heated by means of the circulation of a heated fluid medium or by the employment of an electrically heated wire in the chamber 12. When it is desirable not to heat the substance, dried air can be supplied from the nozzles 18 and heat is not applied to the heat exchange wall 13, thus effectively drying the substance.

When it is necessary to cool the substance, cold air or cold gas can be supplied from the nozzles 18 or ordinary gaseous fluid at ordinary or room temperature can be used while heat exchange wall 13 is cooled by cold air or cold water or other cooling medium in heat exchange chamber 12.

The amount of gaseous fluid supplied from nozzles 18 is dependent on the amount of substance, the particle size, and the time allowed. The minimum amount is dictated by the amount which will serve to blow the substance upward to reach the top of the vessel in a whirling motion. If the amount of gaseous fluid is increased, the whirling motion will be amplified and the time taken for cooling or heating the substance will be shortened.

The heat exchange wall 13 is heated by permitting heated steam to enter the chamber 12 through the inlet 25 and passing through the spiral path 11 and leaving through outlet 26. The substance to be treated is measured and poured into the vessel 14 through feed tube 22, on reaching the bottom of the funnel shaped portion, the substance is blown upward by jets of air or gas at an angle along the surface of the funnel 15 by compressed air or gas supplied from nozzles 18 arranged around the opening at the base of the funnel 15. The substance is blown upward in whirlpool fashion along the surface of the funnel 15 and along the cylindrical wall of the heat exchange vessel. On reaching the top, the particulate material loses its centrifugal motion and drops downwardly from the top center to form circulatory motion of the substance. During this operation, the particulate material is rubbed strongly against the heat exchange wall by centrifugal force and thus breaks down or diminishes the barrier layer adjacent to the heat exchange walls, which tends to prevent efficient heat exchange. Thus heat exchange is carried on efficiently through the heat exchange wall and heating and drying is carried on by air which has been heated by the heat exchange wall. The substance does not ball or form lumps, and does not stick to the wall surface because of the rubbing force against the wall caused by centrifugal force. Air which has removed moisture is exhausted through the filter bag 24. When the substance has been heat dried, valve 20 is opened, and the substance is removed through opening 17 and pipe 21. If air is blown through the nozzles 18 at this time, evacuation of the vessel is speeded up because of the stirring action.

Figure 4:
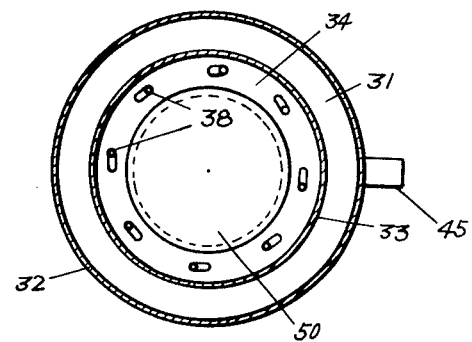
FIG. 4 is a horizontal sectional view across 4—4 in FIG. 3.
Figure 3:
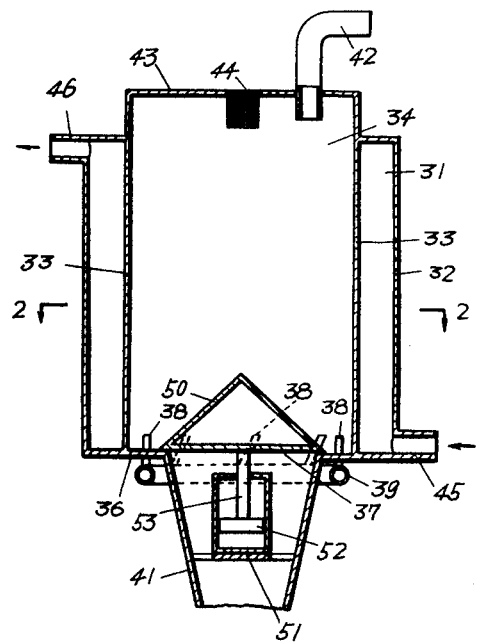
FIG. 3 is a vertical sectional view of another type of apparatus.

A different type of apparatus shown in FIGS. 3 and 4 operates on the same principle as that previously described. A cylindrical chamber 34 with a heat exchanging surface 33 is surrounded by the heat exchange medium chamber 32 with path or chamber 31 for the heat exchange, said chamber 34 having a narrow circular bottom 36 with nozzles 38 arranged in a circle and connected to common ring manifold 39 through which compressed gaseous fluid is supplied to said nozzles 38, said nozzles 38 being inclined upwardly at an angle and along the surface of the cylinder. The opening 37 of the vessel is covered by cone shaped cap 50 which is connected by a rod 53 to the piston 52 which slides in cylinder 51 and is positioned in the outlet tube 41. Therefore, when the piston 52 is moved upwardly, the cone cap 50 is lifted to open the opening 37 of the heat exchange chamber. Loading pipe 42 for loading the chamber 34 with particulate material is mounted on the top plate 43 of the chamber. The top plate 43 has mounted on its under side at its approximate center a filter bag 44 which allows the escape of gaseous fluid but retains the particulate material. A heat exchange medium enters exchange chamber 31 through the inlet 45 and is discharged through the outlet 46 mounted adjacent the top of the medium chamber.

In this type of apparatus, the operation is identical to that of the previously described apparatus. However, in this apparatus the particulate material is blown upwardly in whirling motion by the compressed air jets produced by nozzles 38 placed around the bottom of the heat exchange cylinder 33. On reaching the filter bag, the particulate material loses momentum and therefore drops down the center of the chamber, and is directed by the cone shaped cap 50 to move toward nozzles 38 where it is again blown upwards with whirling motion by the compressed air or gas jets from the nozzles 38. After treatment of the substance is completed, fluid pressure is applied to piston 52 in cylinder 51 and the rod 53 pushes the cone shaped cap 50 upwardly to open outlet port 37 so that removal of the substance can be achieved. In the event that speedy removal is required gaseous fluid can be blown through the nozzles 38 to stir and force out the substance.

Having now described my invention in certain preferred forms, I desire it to be understood that various modifications and improvements may be made within the skill of the art and the scope of the appended claim.

I claim:

1. A heat exchange apparatus comprising a double walled vessel having inner and outer walls, having means between the walls of said vessel for circulating a heat exchange fluid, said vessel being closed at its top and bottom and having in its top inlet means for admitting particulate material, and having in its bottom outlet means for discharging particulate material, said top, said bottom, and said inner wall constituting a chamber for the treatment of the particulate material, means adjacent said bottom for producing a spiral movement of particulate material against the inner wall of the vessel, said bottom being flat and including a valved outlet comprising a fluid pressure operated cone shaped valve.

References Cited

UNITED STATES PATENTS

| | | | |
|---|---|---|---|
| 1,213,887 | 1/1917 | Krause | 34—57 X |
| 1,537,908 | 5/1925 | Willmann | 165—156 |
| 2,292,897 | 8/1942 | Nielsen | 34—57 X |
| 2,363,281 | 11/1944 | Arnold | 34—57 X |
| 2,460,546 | 2/1949 | Stephanoff | 34—57 X |
| 2,719,112 | 9/1955 | Kearby et al. | 34—10 X |
| 2,911,730 | 11/1959 | Schaub et al. | 34—57 |
| 3,068,584 | 12/1962 | Schaub et al. | 34—57 X |
| 3,199,212 | 8/1965 | Foure | 34—10 |
| 3,075,298 | 1/1963 | Schaub | 34—57 X |

FOREIGN PATENTS 231,702   12/1960   Australia.

ROBERT A. O'LEARY, Primary Examiner

A. W. DAVIS, JR., Assistant Examiner

U.S. Cl. X.R.

34—10